(12) United States Patent
Han et al.

(10) Patent No.: US 12,219,410 B2
(45) Date of Patent: Feb. 4, 2025

(54) MESSAGE SENDING METHOD AND APPARATUS, MESSAGE RECEIVING METHOD AND APPARATUS, AND DEVICE AND STORAGE MEDIUM

(71) Applicant: ZTE CORPORATION, Guangdong (CN)

(72) Inventors: Jiren Han, Guangdong (CN); Zhuang Liu, Guangdong (CN); Yin Gao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 344 days.

(21) Appl. No.: 17/774,965

(22) PCT Filed: Nov. 4, 2020

(86) PCT No.: PCT/CN2020/126412
§ 371 (c)(1),
(2) Date: May 6, 2022

(87) PCT Pub. No.: WO2021/088850
PCT Pub. Date: May 14, 2021

(65) Prior Publication Data
US 2022/0394570 A1 Dec. 8, 2022

(30) Foreign Application Priority Data
Nov. 8, 2019 (CN) .......................... 201911088903.9

(51) Int. Cl.
*H04W 36/00* (2009.01)
*H04W 36/22* (2009.01)
*H04W 36/38* (2009.01)

(52) U.S. Cl.
CPC ... *H04W 36/0061* (2013.01); *H04W 36/0072* (2013.01); *H04W 36/00835* (2018.08); *H04W 36/22* (2013.01); *H04W 36/38* (2013.01)

(58) Field of Classification Search
None
See application file for complete search history.

(56) References Cited

U.S. PATENT DOCUMENTS

| 2004/0085909 A1 | 5/2004 | Soliman |
| 2006/0067275 A1 | 3/2006 | Yang et al. |

(Continued)

FOREIGN PATENT DOCUMENTS

| CN | 102480742 A | 5/2012 |
| CN | 104080114 A | 10/2014 |

(Continued)

OTHER PUBLICATIONS

Report on Demand dated Mar. 22, 2023, for Chinese Patent Application No. 2019110889039 (seven (7) pages).

(Continued)

*Primary Examiner* — Frantz Bataille
(74) *Attorney, Agent, or Firm* — KDW Firm PLLC

(57) ABSTRACT

A message receiving method and a message receiving apparatus, a message sending method and a message sending apparatus, a device and a storage medium are provided. The message receiving method includes: sending by the first network element a request message to a second network element, where the request message is used to indicate the second network element to send a request acknowledgement message; receiving the request acknowledgement message sent by the second network element, where the request acknowledgement message carries grid information of a target cell; and updating grid information of the first network element according to the grid information of the target cell carried in the request acknowledgement message.

20 Claims, 6 Drawing Sheets

(56) References Cited

U.S. PATENT DOCUMENTS

| 2014/0038634 A1* | 2/2014 | Eskicioglu .......... H04W 36/322 |
| | | 455/456.1 |
| 2015/0098387 A1 | 4/2015 | Garg et al. |
| 2017/0238218 A1* | 8/2017 | Zhuang ................ H04B 17/327 |
| | | 455/437 |
| 2018/0279397 A1 | 9/2018 | Faccin |

FOREIGN PATENT DOCUMENTS

| CN | 104581949 A | 4/2015 |
| CN | 106465207 A | 2/2017 |
| CN | 106937330 A | 7/2017 |
| CN | 109639816 A | 4/2019 |
| CN | 110062343 A | 7/2019 |
| CN | 111093236 A | 5/2020 |
| EP | 3145260 A1 | 3/2017 |

OTHER PUBLICATIONS

The Notice for the First Trial dated Mar. 25, 2023, or Chinese Patent Application No. 2019110889039 (12 pages).
International Search Report for PCT/CN2020/126412, mailed Feb. 4, 2021 (four (4) pages).
European Search Report for Application No. 20885353 dated Nov. 6, 2023.

* cited by examiner

MESSAGE SENDING METHOD AND APPARATUS, MESSAGE RECEIVING METHOD AND APPARATUS, AND DEVICE AND STORAGE MEDIUM

CROSS-REFERENCE TO RELATED APPLICATION(S)

This is a national stage application filed under 37 U.S.C. 371 based on International Patent Application No. PCT/CN2020/126412, filed Nov. 4, 2020, which claims priority to Chinese Patent Application No. 201911088903.9 filed Nov. 8, 2019, the disclosures of which are incorporated herein by reference in their entireties.

FIELD

The present disclosure relates to a radio communication network, for example, to a message sending method and a message sending apparatus, a message receiving method and a message receiving apparatus, a device, and a storage medium.

BACKGROUND

A radio resource management (RRM) function in a network is implemented based on a granularity of cell, that is, the same policy is executed for all user equipment (UE) in a cell. Due to differences in neighboring cell coverage and performance in different areas within a cell, network information prediction and structure deployment are low in refinement.

SUMMARY

To address at least one of the above technical problems, it is provided according to embodiments of the present disclosure a message sending method and a message sending apparatus, a message receiving method and a message receiving apparatus, a system, and a storage medium.

It is provided according to embodiments of the present disclosure a message receiving method applied to a first network element, and the message receiving method includes:
  sending a request message to a second network element, where the request message is used to indicate the second network element to send a request acknowledgement message;
  receiving the request acknowledgement message sent by the second network element, where the request acknowledgement message carries grid information of a target cell; and
  updating grid information of the first network element according to the grid information of the target cell carried in the request acknowledgement message.

It is further provided according to embodiments of the present disclosure a message sending method applied to a second network element, the message sending method includes:
  receiving a request message sent by a first network element; and
  generating a request acknowledgement message according to the request message, and sending the request acknowledgement message to the first network element, where the request acknowledgement message carries grid information of a target cell, and the grid information of the target cell carried in the request acknowledgement message is used to indicate the first network element to update grid information.

It is further provided according to embodiments of the present disclosure a message receiving apparatus applied in a first network element, and the message receiving apparatus includes:
  a first sending module, which is configured to send a request message to a second network element, where the request message is used to indicate the second network element to send a request acknowledgement message;
  a first receiving module, which is configured to receive the request acknowledgement message sent by the second network element, where the request acknowledgement message carries grid information of a target cell; and
  an updating module, which is configured to update grid information of the first network element according to the grid information of the target cell carried in the request acknowledgement message.

It is further provided according to embodiments of the present disclosure a message sending apparatus applied in a second network element, and the message sending apparatus includes:
  a second receiving module, which is configured to receive a request message sent by a first network element; and
  a second sending module, which is configured to generate a request acknowledgement message according to the request message and send the request acknowledgement message to the first network element, where the request acknowledgement message carries grid information of a target cell, and the grid information of the target cell carried in the request acknowledgement message is used to indicate the first network element to update grid information.

It is further provided according to embodiments of the present disclosure a device including:
  one or more processors; and
  a memory, which is configured to store one or more programs,
  where the one or more programs, when being executed by the one or more processors, cause the one or more processors to implement any one of the methods in the embodiments of the present disclosure.

It is further provided according to embodiments of the present disclosure a non-transitory computer-readable storage medium storing a computer program, and the computer program, when being executed by a processor, implements any one of the methods in the embodiments of the present disclosure.

More description of the preceding embodiments and other aspects of the present disclosure and the implementations thereof is provided in the brief description of drawings, detailed description, and claims.

DETAILED DESCRIPTION

Embodiments of the present disclosure are described hereinafter in detail with reference to the drawings. It is to be noted that if not in conflict, the embodiments and features in the present disclosure may be arbitrarily combined with each other.

The operations illustrated in the flowcharts of the drawings may be performed e.g., in a computer system with a group of computer executable instructions. Although logical sequences are shown in the flowcharts, the shown or described operations may be performed in sequences different from those described herein in some cases.

The technical solutions of the present disclosure can be applied to various communication systems, such as a global system of mobile communication (GSM), a code partition multiple access (CDMA) system, a wideband code partition multiple access (WCDMA) system, a general packet radio service (GPRS) system, a long term evolution (LTE) system, an advanced long term evolution (LTE-A) system, a universal mobile telecommunication system (UMTS), and a fifth generation (5G) mobile communication system, which is not limited in the embodiments of the present disclosure. In the present disclosure, a 5G system is taken as an example for description.

In the embodiments of the present disclosure, the base station may be a device capable of communicating with the user equipment. The base station may be any device having a radio transceiver function, and the base station may include but is not limited to: a base station (NodeB, NB), an evolved base station (evolved NodeB, eNodeB or eNB), a base station in a 5G communication system, a base station in a future communication system, an access node in a WiFi system, a wireless relay node, a wireless backhaul node, and the like. The base station may also be a radio controller in a cloud radio access network (CRAN) scenario. The base station may be a small station, a transmission reference point (TRP), or the like, which is not limited in the embodiments of the present disclosure.

Figure 1:
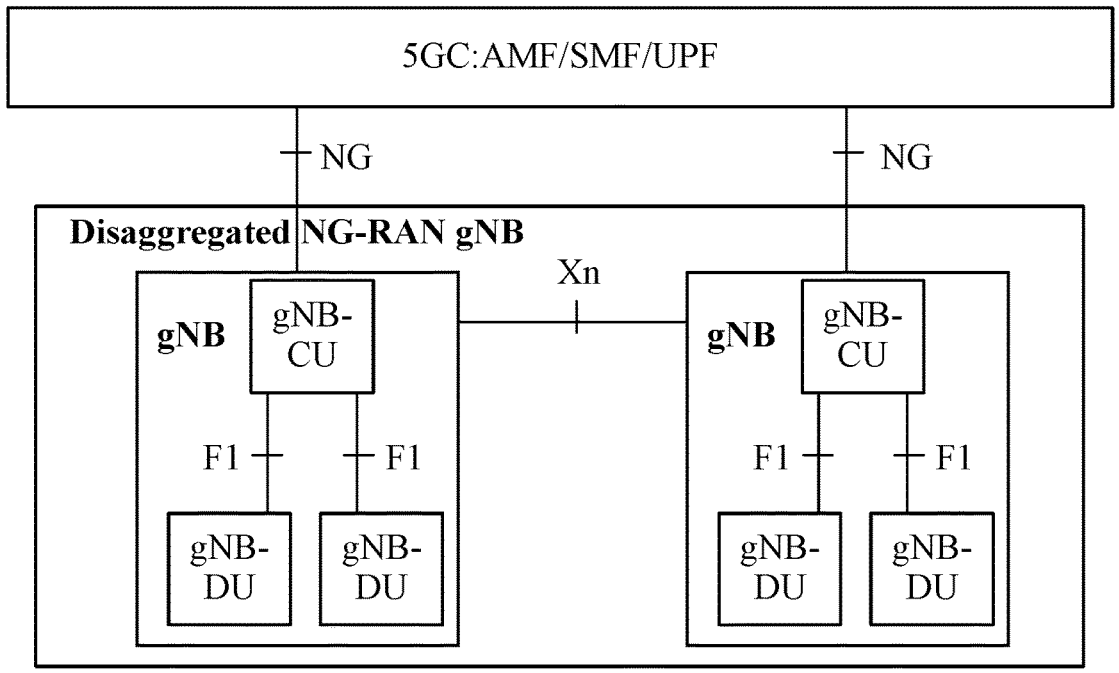
FIG. 1 is an architectural diagram of a NG-RAN disaggregated base station (gNB) in a case where gNB CU/DU air interface protocol stacks are disaggregated.

The next generation radio access network (NG-RAN) base station (the next generation NodeB (gNB) or the next generation-evolved NodeB (ng-eNB)), is connected to a 5G core network (5GC) through standardized NG interfaces, which includes connection through a next generation-control plane (NG-C) and connection through a next generation-user plane (NG-U). The NG-C is a 5G core network element control plane connection and is used for signaling transmission; and the NG-U is a 5G core network element-user plane connection and is used for user data transmission. The NG-RAN base stations (gNBs or ng-eNBs) are connected to each other via Xn interfaces, which includes connection through an Xn-control plane (Xn-C, NG-RAN inter-base station control plane) and connection through an Xn-User plane (Xn-U, NG-RAN inter-base station user plane) connection. FIG. 1 is an architectural diagram of a disaggregated NG-RAN base station (gNB) in a case where centralized units (CU) air interface protocol stack and distributed units (DU) air interface protocol stack are disaggregated. Taking a case of disaggregation of gNB-CU/gNB-DU under the third generation partnership project (3GPP) protocol as an example, a single gNB is disaggregated into a single gNB-CU and multiple gNB-DUs. The gNB-CU is connected to the gNB-DUs via standardized F1 interfaces, which includes connection through an F1-control plane (F1-C) and connection through an F1-user plane (F1-U). Either the interfaces of the gNB/ng-eNB with disaggregated CU/DU or the interfaces of the gNB/ng-eNB with aggregated CU/DU for external connection are NG interfaces and Xn interfaces. The control plane connections of the network interfaces mentioned above are used to transport control signaling messages among network nodes, and the user plane connections are used to transport user service data (packets). The Next generation application protocol (NGAP), XnAP, F1AP are radio network layer (RNL) protocol of NG-C, RNL protocol of Xn-C, and RNL protocol of F1-C, respectively. The NGAP, XnAP, F1AP transport control signaling for corresponding interfaces based on transport and bear (e.g., an SCTP connection) of transport network layer (TNL) under network layer. The user service data frames of the user plane interfaces NG-U, Xn-U, and F1-U transport user service data (packets) for corresponding interfaces based on transport and bear (e.g., GTP-U tunnel) of TNL under network layer. SCTP is a streaming control transport protocol (SCTP) and GTP is a GPRS tunnel protocol.

When the terminal, for example, UE and the NG-RAN base station are in a radio resource control (RRC) connection state, the access to and the mobility management function (AMF) of the core network may request the NG-RAN base station to report user location information (ULI) of a UE on a primary base station side. In this way, the core network may be made aware of the UE location at a cell level in a large heterogeneous network. Unlike obtaining a precise geographic location information of the UE by various positioning means, a minimum accuracy of the ULI is at a serving cell level. The AMF being aware of the ULI of the UE may help it to make differentiated policy configuration and differentiated processing upon different locations of the UE. For example, the AMF may request the NG-RAN base station to report the ULI of the UE, for example, the AMF may request the NG-RAN base station to report directly the information of a serving cell where the UE currently resides; the AMF may request the NG-RAN base station to report a target serving cell information upon change of serving cell; and the AMF may request the NG-RAN base station to report a target AOI information and the like upon UE presences in the area of interest (AOI), and etc.

As described above, the RRM functions in the 5G network are at the granularity of cell, i.e. same RRM policy is applied for all UEs within a serving cell. However, neighboring cell coverage and performance in different areas within the same serving cell are different. A more reasonable treatment should be that different RRM policies are applied for UEs with different neighboring cell coverage characteristics. Therefore, it is necessary to further partition the serving cell, that is, partition at a granularity of grid. A grid is a space partition method in which area is partitioned according to difference in serving cell and difference in signal quality after signal situations of multiple intra-frequency cells in a current environment where a UE is located is obtained by measurement, which is different from conventional space partitions based on geographical location information. A more refined network policy deployment can be achieved by counting the radio characteristics (e.g., neighboring cell coverage, etc.) within each grid.

A self-optimization function in the 5G network can be better improved by grid-level information interaction among different network elements in the 5G network. Moreover, with the introduction of artificial intelligence (AI) and machine learning techniques, network partitioning based on the granularity of grid can facilitate better network information prediction and better network deployment.

Figure 2:
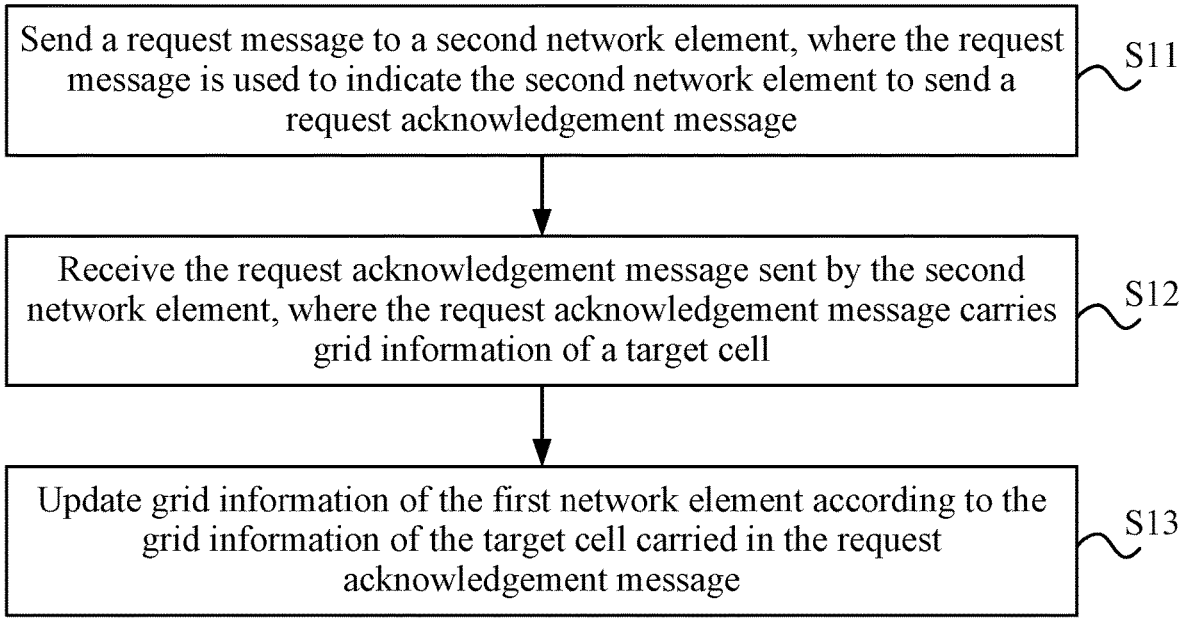
FIG. 2 is a flowchart of a message receiving method according to embodiments of the present disclosure.

FIG. 2 is a flowchart of a message receiving method according to embodiments of the present disclosure. The method may be applied to a case where different areas are partitioned according to grids. The method may be performed by a message receiving apparatus according to the present disclosure, and the message receiving apparatus may be implemented by software and/or hardware. The method is applied to a first network element.

As shown in FIG. 2, the message receiving method according to embodiments of the present disclosure mainly includes operations S11, S12, and S13.

In S11, sending a request message to a second network element, where the request message is used to indicate the second network element to send a request acknowledgement message.

In S12, receiving the request acknowledgement message sent by the second network element, where the request acknowledgement message carries grid information of a target cell.

In S13, updating grid information of the first network element according to the grid information of the target cell carried in the request acknowledgement message.

In this embodiment, the first network element may include any one of the base stations described above. In the case where the first network element is any of the foregoing base stations, the second network element is a base station which is the same as or different from the first network element.

In another example, in a case where the 5G base station employs a CU/DU disaggregated architecture, the first network element may be a centralized unit (CU) in the 5G base station. In the case where the first network element is the centralized unit (CU) in the 5G base station, the second network element is a distributed unit (DU) in the 5G base station.

In one exemplary implementation, before sending a request message to a second network element, the method further includes determining a target cell based on grid information of a serving cell where the UE currently resides; and determining the second network element according to the target cell.

In one exemplary implementation, in a case where the first network element and the second network element each is a next generation nodeB (gNB), the request message is a handover request message, and the request acknowledgement message is a handover request acknowledgement message.

In this embodiment, the gNB1 selects an appropriate target cell for the UE based on grid information of a serving cell where the UE currently resides, and determines the gNB2 according to a correspondence between the target cell and the gNB2; and the gNB1 sends a handover request message to the gNB2. After receiving the handover request message, the gNB2 hands over the UE to the target cell, and the gNB2 sends a handover request acknowledgement message to the gNB1. The handover request acknowledgement message carries grid information of the target cell. The gNB1 updates grid information of the gNB1 according to the above grid information of the target cell.

In one exemplary implementation, in a case where the first network element is a gNB centralized unit (gNB-CU) and the second network element is a gNB distributed unit (gNB-DU), the request message is a context establishment request message and the request acknowledgement message is a context establishment response message.

In this embodiment, the gNB-CU selects an appropriate target cell under a target gNB-DU for the UE based on grid information of a serving cell where the UE currently resides; and the gNB-CU sends a UE context establishment request message to the target gNB-DU. After receiving the UE context establishment request message, the target gNB-DU hands over the UE to the target cell, and the target gNB-DU sends a UE context establishment response message to the gNB-CU. The UE context establishment response message carries grid information of the target cell. The gNB-CU updates grid information of the gNB-CU based on the above grid information of the target cell.

In one exemplary implementation, in a case where the first network element is a gNB centralized unit (gNB-CU) and the second network element is a gNB distributed unit (gNB-DU), the request message is a UE context modification request message and the request acknowledgement message is a UE context modification response message.

In this embodiment, the gNB-CU selects an appropriate target cell under a target gNB-DU for the UE based on grid information of a serving cell where the UE currently resides; and the gNB-CU sends a UE context modification request message to the target gNB-DU. After receiving the UE context modification request message, the target gNB-DU hands over the UE to the target cell, and the target gNB-DU sends a UE context modification response message to the gNB-CU. The UE context modification response message carries grid information of the target cell. The gNB-CU updates grid information of the gNB-CU based on the above grid information of the target cell.

On the basis of the above-described embodiment, the grid information may include grid index information and a UE identifier corresponding to a grid.

In one exemplary implementation, the grid information includes one or more of grid index information; a UE list corresponding to a grid; an intra-frequency neighboring cell list corresponding to the grid; an inter-frequency neighboring cell list corresponding to the grid; a neighboring cell grid list corresponding to the grid; user characteristics in the UE list corresponding to the grid; a beam measurement result corresponding to the grid.

On the basis of the above embodiment, the grid index information includes a public land mobile network identifier (PLMN ID), a gNB identifier (gNB ID), a cell identifier, frequency information, and a reference signal receiving power (RSRP) of a cell.

In one exemplary implementation, the grid index information includes one or more of a public land mobile network identifier (PLMN ID), gNB identifier (gNB ID), a cell identifier, frequency information, a reference signal receiving power (RSRP) of the cell, cell identifiers of intra-frequency neighboring cells, RSRPs of intra-frequency neighboring cells, a synchronization signal and physical broadcast channel (PBCH) block (SSB/PBCH Block) identifier, and a channel state information-reference signal (CSI-RS) identifier.

The user characteristics in the UE list corresponding to the grid include one or more of slice information supported by the UE; a moving state of the UE; and capability information of the UE.

In one exemplary implementation, the grid index information includes a public land mobile network identifier (PLMN ID) document, a gNB identifier (gNB ID), a cell identifier, frequency information, and a reference signal receiving power (RSRP) of the cell.

The beam measurement result corresponding to the grid includes one or more of a synchronization signal reference signal receiving power (SS-RSRP), channel state information reference signal receiving power (CSI-RSRP), synchronization signal reference signal receiving quality (SS-RSRQ), channel state information reference signal receiving quality (CSI-RSRQ), and channel state information signal to interference and noise ratio (CSI-SINR).

In an exemplary implementation, before sending a request message to a second network element, the method further includes: receiving a configuration update message sent by the second network element, where the configuration update message carries predicted load information of granularity of grid; and determining a target cell according to the predicted load information carried in the configuration update message.

In a case where the first network element and the second network element each is a next generation nodeB (gNB), the gNB2 sends an NG-RAN node configuration update message to the gNB1, where the NG-RAN node configuration update message carries the predicted load information of the granularity of grid; the gNB1 sends an NG-RAN node configuration update acknowledgement message to the gNB2 after receiving the NG-RAN node configuration update message. The gNB1 selects an appropriate target cell for the UE according to the predicted load information reported by the gNB2. After the target cell is determined, the operation flows in the gNB1 and the gNB2 are basically the same as the operation flows in the gNB1 and the gNB2 provided in the above embodiments, which are not repeatedly described in this embodiment, and reference may be made to the above embodiments.

In a case where the first network element is a gNB-CU and the second network element is a gNB-DU, the gNB-DU sends an gNB-DU configuration update message to the gNB-CU, where the gNB-DU configuration update message carries a predicted load information of granularity of grid; the gNB-CU sends a gNB-DU configuration update acknowledgement message to the gNB-DU after receiving the gNB-DU configuration update message. The gNB-CU selects an appropriate target cell for the UE according to the predicted load information reported by the gNB-DU. After the target cell is determined, the operation flows in the gNB-CU and the gNB-DU may be substantially the same as the operation flows in the gNB-CU and the gNB-DU provided in the above embodiments, which are not repeatedly described in this embodiment, and reference may be made to the above embodiments.

On the basis of the above embodiments, the predicted load information is used to indicate load information of any cell over the second network element in a next time period, and the time period includes at least one of second, minute, hour or other granularity of time.

In one exemplary implementation, the predicted load information may include composite available capacity information, hardware load information, physical resource block information, and power consumption information.

The predicted load information includes one or more of composite available capacity information, hardware load information, physical resource block information, and power consumption information.

Figure 3:
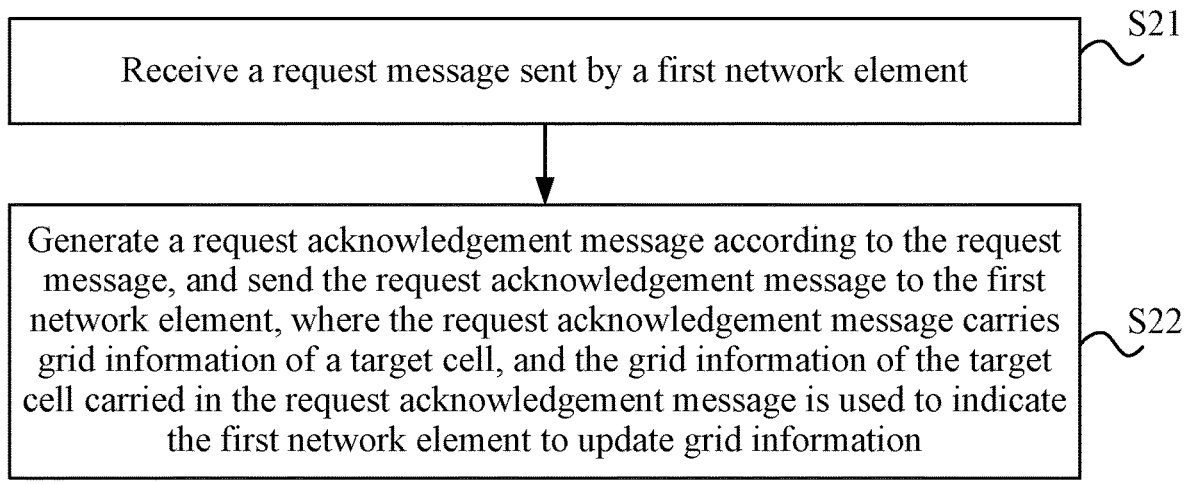
FIG. 3 is a flowchart of a message sending method according to embodiments of the present disclosure.

FIG. 3 is a flowchart of a message sending method according to embodiments of the present disclosure. The method can be applied to a case where different areas are partitioned according to grids. The method may be performed by a message sending apparatus according to the present disclosure, and the message sending apparatus may be implemented by software and/or hardware, the method is applied to a first network element.

As shown in FIG. 3, the message sending method according to the embodiments of the present disclosure mainly includes operations S21 and S22.

In S21, receiving a request message sent by a first network element.

In S22, generating a request acknowledgement message according to the request message, and sending the request acknowledgement message to the first network element, where the request acknowledgement message carries grid information of a target cell, and the grid information of the target cell carried in the request acknowledgement message is used to indicate the first network element to update grid information.

In one exemplary implementation, in a case where the first network element and the second network element each is a next generation nodeB (gNB), the request message is a handover request message, and the request acknowledgement message is a handover request acknowledgement message.

In this embodiment, the gNB1 selects an appropriate target cell for the UE based on grid information of a serving cell where the UE currently resides; the gNB1 sends a handover request message to the gNB2. After receiving the handover request message, the gNB2 hands over the UE to the target cell, and the gNB2 sends a handover request acknowledgement message to the gNB1. The handover request acknowledgement message carries grid information of the target cell. The gNB1 updates grid information of the gNB1 according to the above grid information of the target cell.

In one exemplary implementation, in a case where the first network element is a gNB centralized unit (gNB-CU) and the second network element is a gNB distributed unit (gNB-DU), the request message is a UE context establishment request message and the request acknowledgement message is a UE context establishment response message.

In this embodiment, the gNB-CU selects an appropriate target cell under a target gNB-DU for the UE based on grid information of a serving cell where the UE currently resides; and the gNB-CU sends a UE context establishment request message to the target gNB-DU. After receiving the UE context establishment request message, the target gNB-DU hands over the UE to the target cell, and the target gNB-DU sends a UE context establishment response message to the gNB-CU. The UE context establishment response message carries grid information of the target cell. The gNB-CU updates grid information of the gNB-CU based on the above grid information of the target cell.

In one exemplary implementation, in a case where the first network element is a gNB centralized unit (gNB-CU) and the second network element is a gNB distributed unit (gNB-DU), the request message is a UE context modification request message and the request acknowledgement message is a UE context modification response message.

In this embodiment, the gNB-CU selects an appropriate target cell under a target gNB-DU for the UE based on grid information of a serving cell where the UE currently resides; and the gNB-CU sends a UE context modification request message to the target gNB-DU. After receiving the UE context modification request message, the target gNB-DU hands over the UE to the target cell, and the target gNB-DU sends a UE context modification response message to the gNB-CU. The UE context modification response message carries grid information of the target cell. The gNB-CU updates grid information of the gNB-CU based on the above grid information of the target cell.

On the basis of the above embodiments, the grid information includes one or more of grid index information, a UE list corresponding to a grid, an intra-frequency neighboring cell list corresponding to the grid, an inter-frequency neighboring cell list corresponding to the grid, a neighboring cell grid list corresponding to the grid, user characteristics in the UE list corresponding to the grid, and a beam measurement result corresponding to the grid.

The grid index information includes one or more of a public land mobile network identifier (PLMN ID), gNB identifier (gNB ID), a cell identifier, frequency information, and a reference signal receiving power (RSRP) of the cell, cell identifiers of intra-frequency neighboring cells, RSRPs of intra-frequency neighboring cells, a synchronization signal and physical broadcast channel block (SSB/PBCH Block) identifier, and a channel state information-reference signal (CSI-RS) identifier.

The user characteristics in the UE list corresponding to the grid include one or more of slice information supported by the UE; a moving state of the UE; and capability information of the UE.

The beam measurement result corresponding to the grid includes one or more of a synchronization signal-reference signal receiving power (SS-RSRP), channel state information-reference signal receiving power (CSI-RSRP), synchronization signal reference signal receiving quality (SS-RSRQ), channel state information-reference signal receiving quality (CSI-RSRQ), and channel state information-signal to interference and noise ratio (CSI-SINR).

In an exemplary implementation, before receiving a request message sent by a first network element, the method further includes: sending a configuration update message to the first network element, where the configuration update message carries predicted load information of granularity of grid, and the predicted load information carried in the configuration update message is used to indicate the first network element to determine the second network element; and receiving a configuration update acknowledgement message sent by the first network element.

In a case where the first network element and the second network element each is a next generation nodeB (gNB), the gNB2 sends an NG-RAN node configuration update message to the gNB1, where the NG-RAN node configuration update message carries the predicted load information of the granularity of grid; the gNB1 sends an NG-RAN node configuration update acknowledgement message to the gNB2 after receiving the NG-RAN node configuration update message. The gNB1 selects an appropriate target cell for the UE according to the predicted load information reported by the gNB2. After the target cell is determined, the operation flows in the gNB1 and the gNB2 are basically the same as the operation flows in the gNB1 and the gNB2 provided in the above embodiments, which are not repeatedly described in this embodiment, and reference may be made to the above embodiments.

In a case where the first network element is a gNB-CU and the second network element is a gNB-DU, the gNB-DU sends an gNB-DU configuration update message to the gNB-CU, where the gNB-DU configuration update message carries a predicted load information of granularity of grid; the gNB-CU sends a gNB-DU configuration update acknowledgement message to the gNB-DU after receiving the gNB-DU configuration update message. The gNB-CU selects an appropriate target cell for the UE according to the predicted load information reported by the gNB-DU. After the target cell is determined, the operation flows in the gNB-CU and the gNB-DU may be basically the same as the operation flows in the gNB-CU and the gNB-DU provided in the above embodiments, which are not repeatedly described in this embodiment, and reference may be made to the above embodiments.

On the basis of the above embodiments, the predicted load information is used to indicate load information of any cell over the second network element in a next time period, and the time period includes at least one of second, minute, hour or other granularity of time.

The predicted load information includes one or more of composite available capacity information, hardware load information, physical resource block information, and power consumption information.

Figure 4:
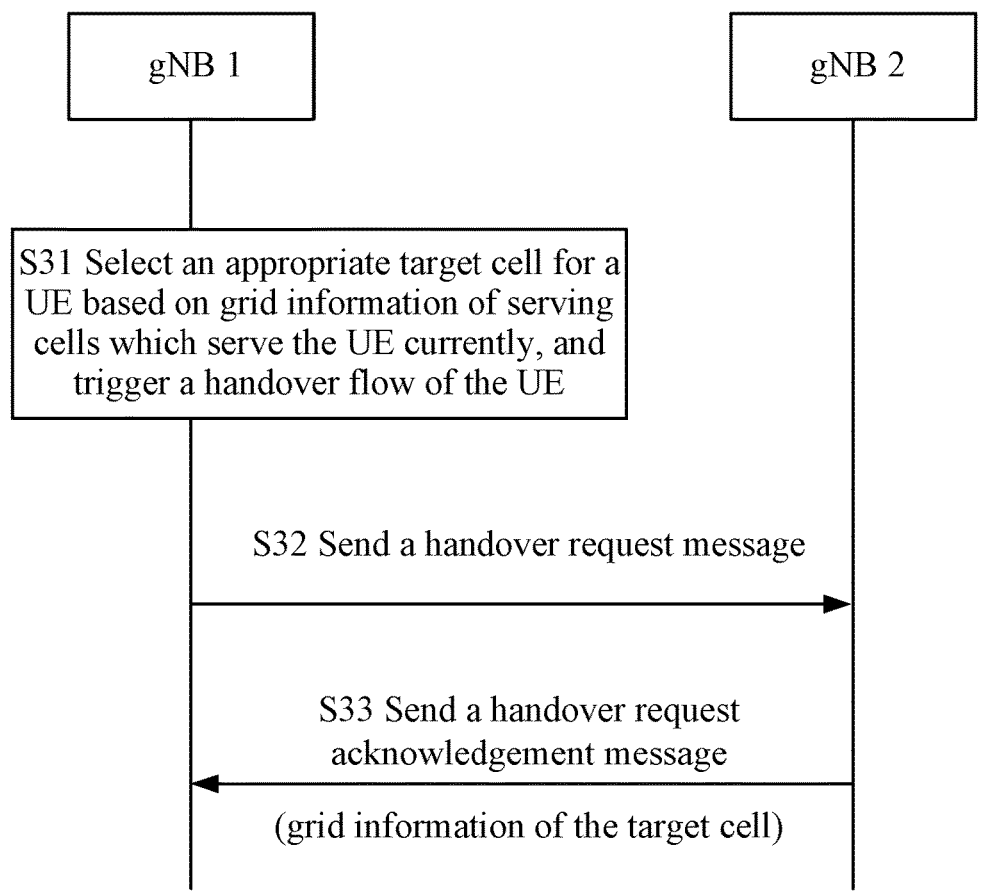
FIG. 4 is a flowchart showing a process how UEs performs handover among base stations (gNBs) according to embodiments of the present disclosure.

In one application example, FIG. 4 is a flowchart showing a process how UEs performs handover among base stations (gNBs) according to embodiments of the present disclosure. As shown in FIG. 4, the process of handover of the UE among base stations based on grid information mainly includes operations S31, S32, and S33.

In S31, the gNB1 selects an appropriate target cell for a UE based on grid information of a serving cell which serve the UE currently, and triggers a handover flow of the UE.

The grid information includes one or more of grid index information, a UE list corresponding to a grid, an intra-frequency neighboring cell list corresponding to the grid, an inter-frequency neighboring cell list corresponding to the grid, a neighboring cell grid list corresponding to the grid, user characteristics in the UE list corresponding to the grid, a beam measurement result corresponding to the grid.

The grid index information includes a PLMN ID, gNB ID, cell ID, frequency information, an RSRP of the cell, a cell ID of intra-frequency neighboring cells, RSRPs of intra-frequency neighboring cells, an SSB identifier, a CSI-RS identifier. The beam measurement result corresponding to the grid includes an SS-RSRP, a CSI-RSRP, SS-RSRQ, CSI-RSRQ, and CSI-SINR.

The user characteristics in the UE list corresponding to the grid include slice information supported by the UE, a moving state of the UE, capability information of the UE.

In S32, the gNB1 sends a handover request message to the gNB2 where the target cell is located.

In S33, the gNB2 sends a handover request acknowledgement message to the gNB1, where the handover request acknowledgement message carries grid information of the target cell, to allow the gNB1 to update grid information.

Figure 5:
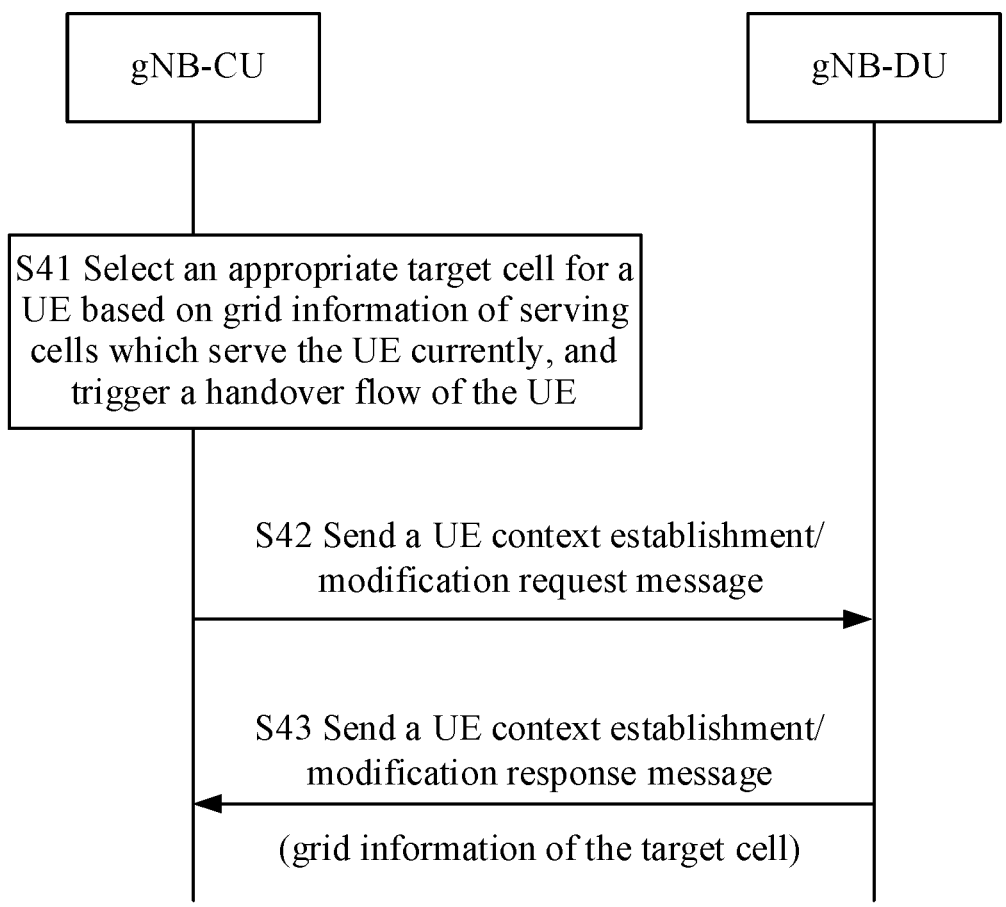
FIG. 5 is a flowchart showing a process how UEs performs handover among gNB-DUs according to embodiments of the present disclosure.

In one application example, FIG. 5 is a flowchart showing another process of handover of a UE among base stations (gNBs) according to embodiments of the present disclosure. As shown in FIG. 5, in a CU-DU disaggregated architecture, the process of handover of the UE between different cells based on grid information mainly includes operations S41, S42, and S43.

In S41, the gNB-CU selects an appropriate target cell under a target gNB-DU for a UE based on grid information of a serving cell which serves the UE currently, and triggers a handover flow of the UE.

The grid information includes grid index information, a list of UEs corresponding to the grid, an intra-frequency neighboring cell list corresponding to the grid, an inter-frequency neighboring cell list corresponding to the grid, a neighboring cell grid list corresponding to the grid, user characteristics in the UE list corresponding to the grid, a beam measurement result corresponding to the grid.

The grid index information includes a PLMN ID, gNB ID, cell ID, frequency information, an RSRP of the cell, a cell ID of intra-frequency neighboring cells, RSRPs of intra-frequency neighboring cells, an SSB identifier, a CSI-RS identifier.

The beam measurement result corresponding to the grid includes an SS-RSRP, a CSI-RSRP, an SS-RSRQ, a CSI-RSRQ, a CSI-SINR.

The user characteristics in the UE list corresponding to the grid include slice information supported by the UE, a moving state of the UE, capability information of the UE.

In S42, the gNB-CU sends a UE context establishment request message to the gNB-DU where the target cell is located.

In S43, the gNB-DU sends a UE context establishment response message to the gNB-CU, where the UE context establishment response message includes grid information of a target cell, to facilitate the gNB-CU to update grid information.

In an application example, the above UE context establishment message may also be a UE context modification request message, and correspondingly, the UE context establishment response message is a UE context modification response message.

Figure 6:
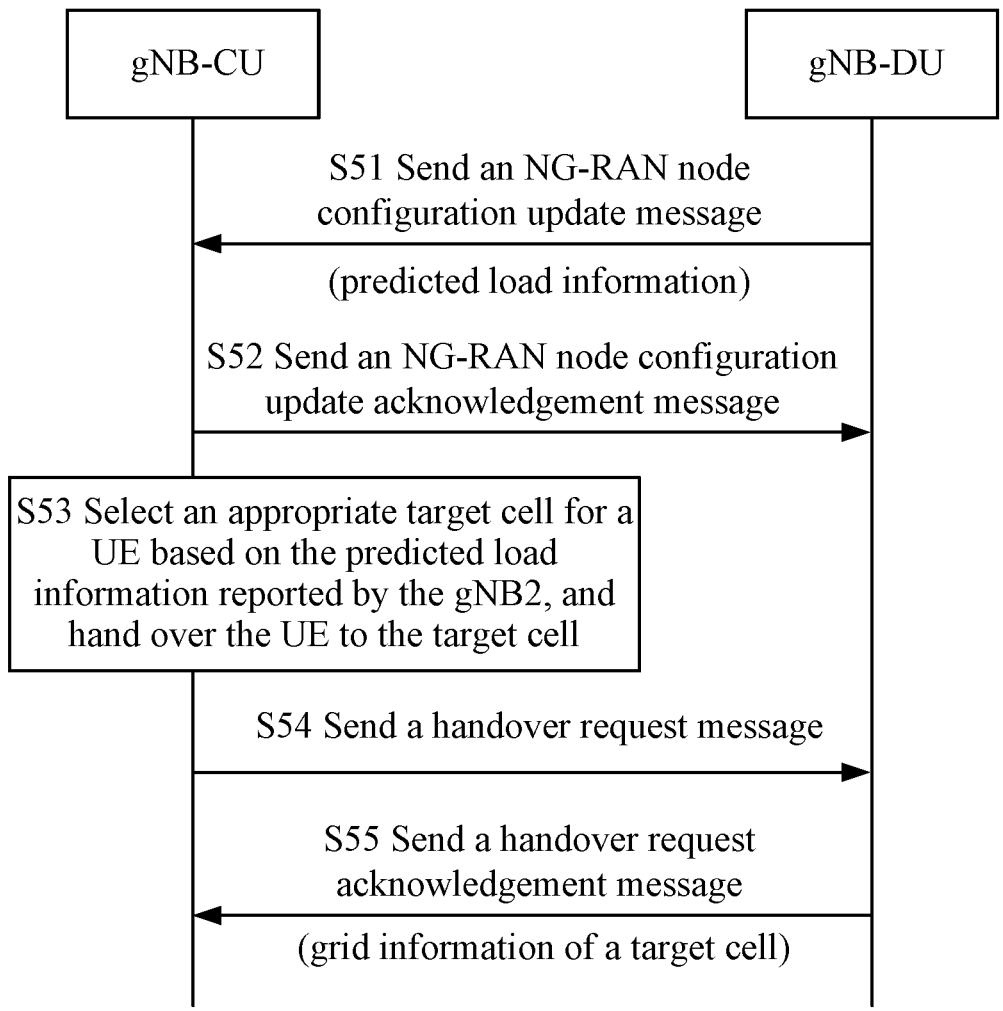
FIG. 6 is a flowchart showing a process how UEs performs handover among base stations (gNBs) when load balancing is adopted at a base station side according to embodiments of the present disclosure.

In one application example, FIG. 6 is a flowchart showing a process how UEs performs handover among base stations (gNBs) when load balancing is adopted at a base station side according to embodiments of the present disclosure. As shown in FIG. 6, after the load balancing is adopted at a base station side, the process of handover of the UE between different cells based on the grid information mainly includes operations S51, S52, S53, S54, and S55.

In S51, the gNB2 sending an NG-RAN node configuration update message to the gNB1, where the NG-RAN node configuration update message carries predicted load information of grid level, and the predicted load information is used to indicate predicted load information of a grid of a cell of the gNB2 in a next time period, the time period may be seconds, minutes, hours, or other granularity of time. The load information may include composite usable capacity information, hardware load information, physical resource block information, and power consumption information.

In S52, the gNB1 sends an NG-RAN node configuration update acknowledgement message to the gNB2.

In S53, the gNB1 selects an appropriate target cell for the UE based on the predicted load information of grid level reported by the gNB2, and hands over a designated UE to the target cell.

In S54, the gNB1 sends a handover request message to the gNB2 where the target cell is located.

In S55, the gNB2 sends a handover request acknowledgement message to the gNB1, where the handover request acknowledgement message carries grid information of a target cell, to facilitate the gNB1 to update grid information.

The grid information includes grid index information, a list of UEs corresponding to the grid, an intra-frequency neighboring cell list corresponding to the grid, an inter-frequency neighboring cell list corresponding to the grid, a neighboring cell grid list corresponding to the grid, user characteristics in the UE list corresponding to the grid, a beam measurement result corresponding to the grid.

The grid index information includes a PLMN ID, gNB ID, cell ID, frequency information, an RSRP of the cell, a cell ID of intra-frequency neighboring cells, RSRPs of intra-frequency neighboring cells, an SSB identifier, a CSI-RS identifier.

The beam measurement result corresponding to the grid includes an SS-RSRP, a CSI-RSRP, an SS-RSRQ, a CSI-RSRQ, a CSI-SINR.

The user characteristics in the UE list corresponding to the grid include slice information supported by the UE, a moving state of the UE, capability information of the UE.

Figure 7:
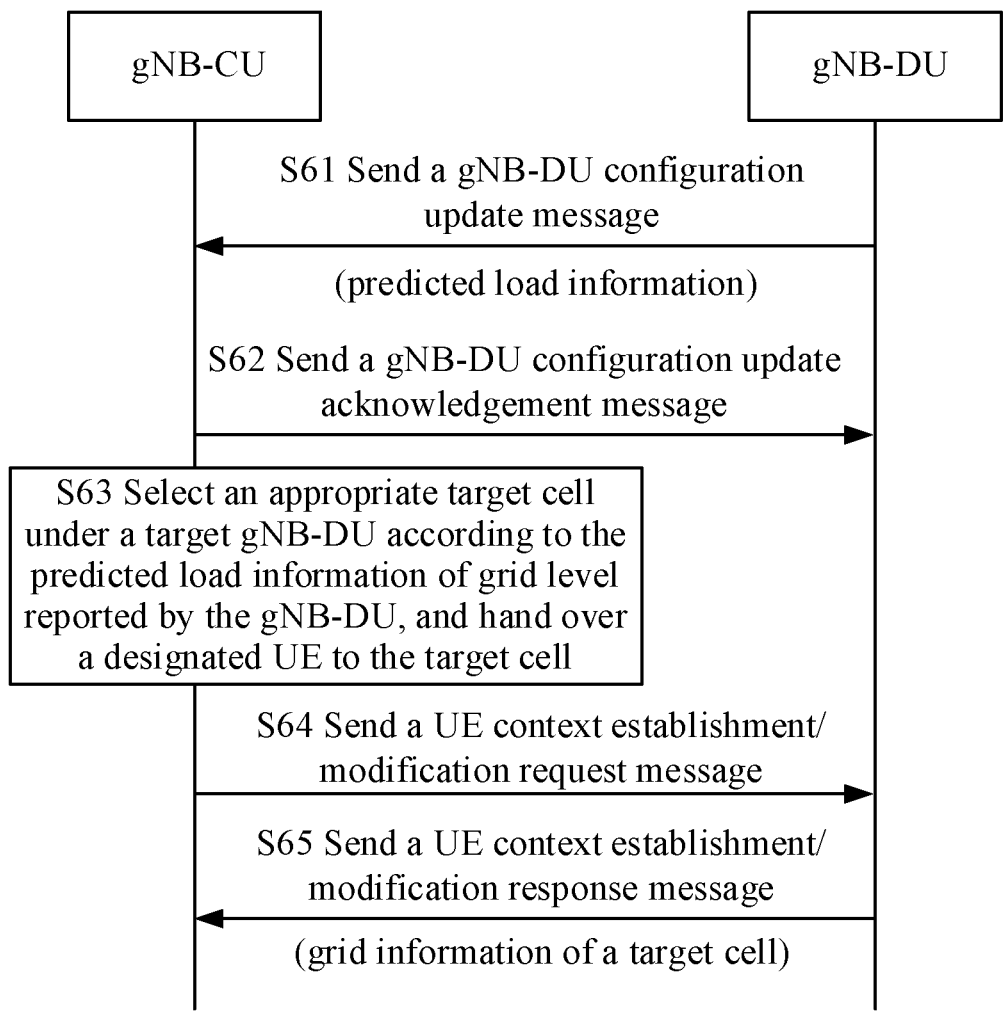
FIG. 7 is a flowchart showing a process how UEs performs handover among gNB-DUs when load balancing is adopted at a gNB-CU side according to embodiments of the present disclosure.

In one application example, FIG. 7 is a flowchart showing the process of handover of a UE among gNB-DUs when load balancing is adopted at a gNB-CU side according to embodiments of the present disclosure. As shown in FIG. 7, after the load balancing is adopted at the gNB-CU side, the process of handover of the UE among different cells based on grid information mainly includes operations S61, S62, S63, S64, and S65.

In S61, a gNB-DU sends a gNB-DU configuration update message to a gNB-CU, where the gNB-DU configuration update message carries predicted load information of grid level, and the predicted load information is used to indicate predicted load information of a grid of a cell of the gNB-DU in a next time period, the time period may be seconds, minutes, hours, or other granularity of time. The load information may include composite usable capacity information, hardware load information, physical resource block information, and power consumption information.

In S62, the gNB-CU sends a gNB-DU configuration update acknowledgement message to the gNB-DU.

In S63, the gNB-CU selects an appropriate target cell under a target gNB-DU according to the predicted load information of grid level reported by the gNB-DU, and hands over a designated UE to the target cell.

In S64, the gNB-CU sends a UE context establishment request message or a UE context modification request message to the gNB-DU where the target cell is located.

In S65, the gNB-DU sends a UE context establishment response message or a UE context modification response message to the gNB-CU, where the UE context establishment response message or the UE context modification response message carries grid information of a target cell, to facilitate the gNB-CU to update grid information.

The grid information includes grid index information, a list of UEs corresponding to the grid, an intra-frequency neighboring cell list corresponding to the grid, an inter-frequency neighboring cell list corresponding to the grid, a neighboring cell grid list corresponding to the grid, user characteristics in the UE list corresponding to the grid, a beam measurement result corresponding to the grid.

The grid index information includes a PLMN ID, gNB ID, cell ID, frequency information, an RSRP of the cell, a cell ID of intra-frequency neighboring cells, RSRPs of intra-frequency neighboring cells, an SSB identifier, a CSI-RS identifier. The beam measurement result corresponding to the grid includes an SS-RSRP, a CSI-RSRP, SS-RSRQ, a CSI-RSRQ, a CSI-SINR.

The user characteristics in the UE list corresponding to the grid include slice information supported by the UE, a moving state of the UE, capability information of the UE.

In an application example, the above UE context establishment message may also be a UE context modification request message, and correspondingly, the UE context establishment response message may also be a UE context modification response message.

Figure 8:
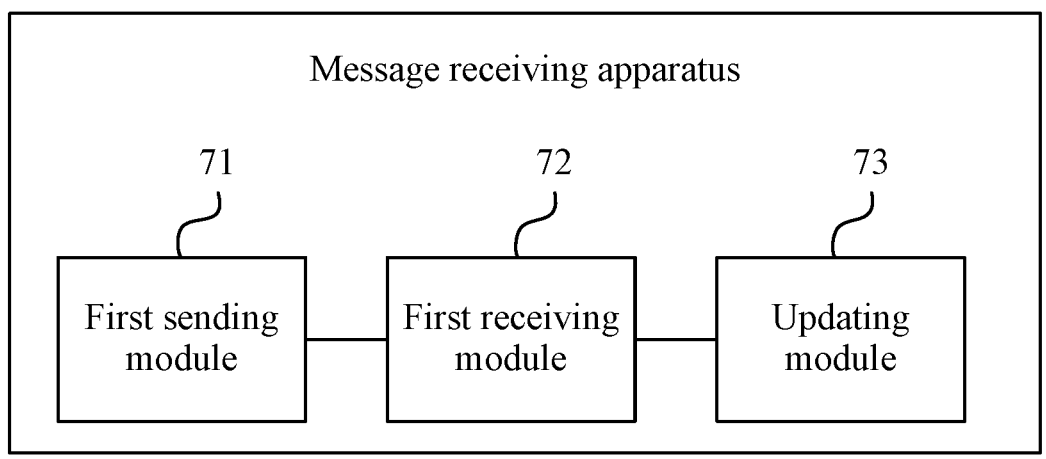
FIG. 8 is a schematic structural diagram of a message receiving apparatus according to embodiments of the present disclosure.

In one exemplary implementation, FIG. 8 is a schematic structural diagram of a message receiving apparatus according to embodiments of the present disclosure. The apparatus may be applied to a case where different areas are partitioned according to grids. The message receiving apparatus may be implemented by software and/or hardware, the apparatus may be provided in a first network element, and the first network element may be a gNB or a gNB-CU. As shown in FIG. 8, the apparatus may include a first sending module 71, a first receiving module 72, and an updating module 73.

The first sending module 71 is configured to send a request message to a second network element, where the request message is used to indicate the second network element to send a request acknowledgement message; the first receiving module 72 is configured to receive the request acknowledgement message sent by the second network element, where the request acknowledgement message carries grid information of a target cell; and the updating module 73 is configured to update grid information of the first network element according to the grid information of the target cell carried in the request acknowledgement message.

The message receiving apparatus according to this embodiment is used to execute the message receiving method according to the embodiments of the present disclosure. The implementation principle and technical effect of the message receiving apparatus according to this embodiment are similar to the implementation principle and technical effect of the message receiving method according to the embodiments of the present disclosure, which are not repeatedly described herein.

In one exemplary implementation, the apparatus further includes a determining module, which is configured to determine a target cell based on grid information of a serving cell where the UE currently resides and determine the second network element according to the target cell.

In one exemplary implementation, in a case where the first network element and the second network element each is a next generation nodeB (gNB), the request message is a handover request message, and the request acknowledgement message is a handover request acknowledgement message.

In one exemplary implementation, in a case where the first network element is a gNB centralized unit (gNB-CU) and the second network element is a gNB distributed unit (gNB-DU), the request message is a UE context establishment request message and the request acknowledgement message is a UE context establishment response message; the request message is a UE context modification request message, and the request acknowledgement message is a UE context modification response message.

In one exemplary implementation, the grid information may include grid index information and a UE identifier corresponding to a grid.

In one exemplary implementation, the grid information includes one or more of grid index information, a UE list corresponding to a grid, an intra-frequency neighboring cell list corresponding to the grid, an inter-frequency neighboring cell list corresponding to the grid, a neighboring cell grid list corresponding to the grid, user characteristics in the UE list corresponding to the grid, a beam measurement result corresponding to the grid.

In one exemplary implementation, the grid index information may include a public land mobile network identifier (PLMN ID), a gNB identifier (gNB ID), a cell identifier, frequency information, and a reference signal receiving power (RSRP) of a cell.

In one exemplary implementation, the grid index information includes one or more of a public land mobile network identifier (PLMN ID), gNB identifier (gNB ID), a cell identifier, frequency information, a reference signal receiving power (RSRP) of a cell, cell identifiers of intra-frequency neighboring cells, RSRPs of intra-frequency neighboring cells, a synchronization signal and physical broadcast channel block (SSB/PBCH Block) identifier, and a channel state information-reference signal (CSI-RS) identifier.

In one exemplary implementation, the user characteristics in the UE list corresponding to the grid include one or more of slice information supported by a UE, a moving state of a UE, and capability information of a UE.

In one exemplary implementation, the grid information includes a beam measurement result corresponding to the grid, and the beam measurement result corresponding to the grid includes a synchronization signal-reference signal receiving power SS-RSRP and a channel state information-reference signal receiving power CSI-RSRP.

In one exemplary implementation, the beam measurement result corresponding to the grid includes one or more of an SS-RSRP, a CSI-RSRP, an SS-RSRQ, a CSI-RSRQ, and CSI-SINR.

In one exemplary implementation, the first receiving module 72 is configured to receive a configuration update message sent by the second network element, where the configuration update message carries predicted load information of the granularity of grid. The determining module is configured to determine a target cell according to the predicted load information carried in the configuration update message.

In one exemplary implementation, the predicted load information is used to indicate the load information of any cell over the second network element in a next time period.

In one exemplary implementation, the predicted load information includes composite available capacity information, hardware load information, and physical resource block information.

Figure 9:
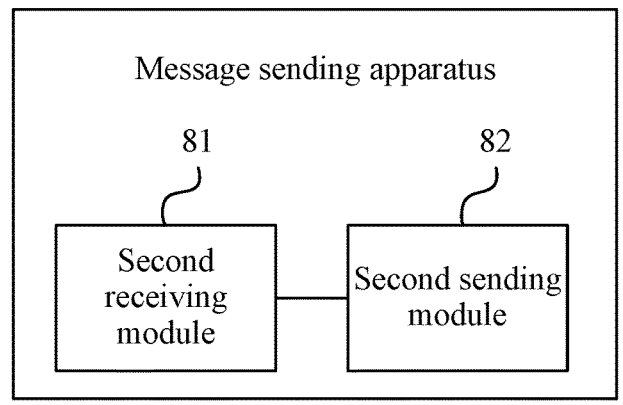
FIG. 9 is a schematic structural diagram of a message sending apparatus according to embodiments of the present disclosure.

FIG. 9 is a schematic structural diagram of a message sending apparatus according to embodiments of the present disclosure. The apparatus may be applied to a case where different areas are partitioned according to grids. The message sending apparatus may be implemented by software and/or hardware, the apparatus may be provided in a second network element, and the second network element may be a gNB and may also be a gNB-DU. As shown in FIG. 9, the apparatus may include a second receiving module 81, and a second sending module 82.

The second receiving module 81 is configured to receive a request message sent by the first network element, and the second sending module 82 is configured to generate a request acknowledgement message according to the request message, and send the request acknowledgement message to the first network element, where the request acknowledgement message carries grid information of a target cell, and the grid information of the target cell carried in the request acknowledgement message is used to indicate the first network element to update grid information.

The message sending apparatus according to this embodiment is used to execute the message sending method according to the embodiments of the present disclosure. The implementation principle and technical effect of the message sending apparatus according to this embodiment are similar to the implementation principle and technical effect of the message sending method according to the embodiments of the present disclosure, which are not repeatedly described herein.

In one exemplary implementation, in a case where the first network element and the second network element each is a next generation nodeB (gNB), the request message is a handover request message, and the request acknowledgement message is a handover request acknowledgement message.

In one exemplary implementation, in a case where the first network element is a gNB centralized unit (gNB-CU) and the second network element is a gNB distributed unit (gNB-DU), the request message is a UE context establishment request message and the request acknowledgement message is a UE context establishment response message, the request message is a UE context modification request message, and the request acknowledgement message is a UE context modification response message.

In one exemplary implementation, the grid information may include grid index information and a UE identifier corresponding to a grid.

In one exemplary implementation, the grid information includes one or more of grid index information, a UE list corresponding to a grid, an intra-frequency neighboring cell list corresponding to the grid, an inter-frequency neighboring cell list corresponding to the grid, a neighboring cell grid list corresponding to the grid, user characteristics in the UE list corresponding to the grid, a beam measurement result corresponding to the grid.

In one exemplary implementation, the grid index information may include a public land mobile network identifier (PLMN ID), a gNB identifier (gNB ID), a cell identifier, frequency information, and a reference signal receiving power (RSRP) of the cell.

In one exemplary implementation, the grid index information includes one or more of a public land mobile network identifier (PLMN ID), a gNB identifier (gNB ID), a cell identifier, frequency information, reference signal receiving power (RSRP) of a cell, cell identifiers of intra-frequency neighboring cells, RSRPs of intra-frequency neighboring cells, a synchronization signal and physical broadcast channel block (SSB/PBCH Block) identifier, a channel state information-reference signal (CSI-RS) identifier.

In one exemplary implementation, the user characteristics in the UE list corresponding to the grid include one or more of slice information supported by the UE, a moving state of the UE, and capability information of the UE.

In one exemplary implementation, the grid information includes a beam measurement result corresponding to the grid, and the beam measurement result corresponding to the grid includes a synchronization signal-reference signal receiving power SS-RSRP and a channel state information-reference signal receiving power CSI-RSRP.

In one exemplary implementation, the beam measurement result corresponding to the grid includes one or more of an SS-RSRP, a CSI-RSRP, an SS-RSRQ, a CSI-RSRQ, and CSI-SINR.

In one exemplary implementation, the second sending module 82 is configured to send a configuration update message to the first network element, where the configuration update message carries predicted load information of the grid granularity; the predicted load information carried in the configuration update message is used to indicate the first network element to determine the second network element; and the second receiving module 81 is configured to receive a configuration update acknowledgement message sent by the first network element.

In one exemplary implementation, the predicted load information is used to indicate the load information of any cell over the second network element in a next time period.

In one exemplary implementation, the predicted load information may include composite available capacity information, hardware load information, physical resource block information and power consumption information.

Figure 10:
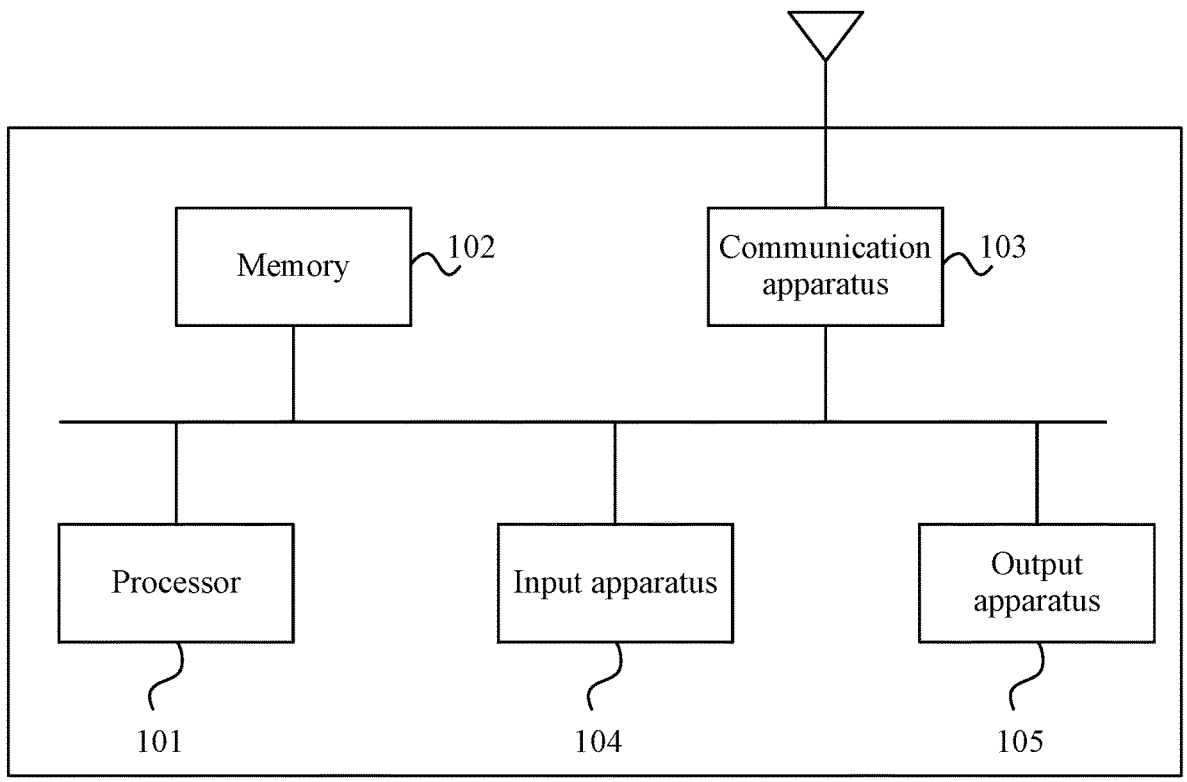
FIG. 10 is a schematic structural diagram of a device according to the present disclosure.

A device is further provided according to embodiments of the present disclosure. FIG. 10 is a schematic structural diagram of a device according to the present disclosure. As shown in FIG. 10, the device according to the present disclosure includes one or more processes 101 and a memory 102. The device may include one or more processors 101, and one processor 101 included is taken as an example in FIG. 10. The memory 102 is configured to store one or more programs. The one or more programs are executed by the one or more processors 101, to cause the one or more processors 101 to implement the method as described in the embodiments of the present disclosure.

The device further includes a communication apparatus 103, an input apparatus 104, and an output apparatus 105.

The processors 101, the memory 102, the communication apparatus 103, the input apparatus 104, and the output apparatus 105 in the device may be connected via a bus or other means, and in FIG. 10, a case in which they are connected via a bus is taken as an example.

The input apparatus 104 may be configured to receive input numeric or character information and to generate input of key-pressing signal related to user settings of the device and functional control of the device. The output apparatus 105 may include a display device such as a display screen.

The communication apparatus 103 may include a receiver and a transmitter. The communication apparatus 103 is configured to perform information transmission/reception communication under the control of the processor 101.

As a computer-readable storage medium, the memory 102 may be configured to store a software program, a computer-executable program and a module, such as the program instructions/module corresponding to the message receiving method according to the embodiments of the present disclosure (e.g., the first sending module 71, the first receiving module 72 and the updating module 73 in the message receiving apparatus, and further as the program instruction/module corresponding to the message sending method according to embodiments of the present disclosure (e.g., the second receiving module 81 and the second sending module 82 in the message sending apparatus). The memory 102 may include a program storage area and a data storage area, where the program storage area may store an operating system and at least one application program required by functions, the data storage area may store data created during a utilization of the device, and etc. The memory 102 may include a high-speed random access memory, and may further include a non-volatile memory, such as at least one magnetic disk storage apparatus, a flash memory device, or other non-volatile solid-state storage apparatus. In some examples, the memory 102 may further include memories which are remotely provided with respect to the processor 101, and these remote memories may be connected to the device through a network. Examples of the aforementioned network include, but are not limited to, the Internet, an intranet, a local area network, a mobile communication network, or any combination thereof.

It should be noted that in a case where the device according to the embodiments of the present disclosure is the gNB1 or the gNB-CU, the above device may implement the message receiving method described in any one of the embodiments of the present disclosure, the method includes sending a request message to a second network element, the request message being used to indicate the second network element to send a request acknowledgement message; receiving the request acknowledgement message sent by the second network element, the request acknowledgement message carrying grid information of a target cell; and updating grid information of the first network element according to the grid information of the target cell carried in the request acknowledgement message.

In a case where the device according to the embodiments of the present disclosure is a gNB2 or a gNB-DU, the above device may implement the message sending method described in any one of the embodiments of the present disclosure, the method includes: receiving a request message sent by a first network element; generating a request acknowledgement message according to the request message, and sending the request acknowledgement message to the first network element, where the request acknowledgement message carries grid information of a target cell, and the grid information of the target cell carried in the request acknowledgement message is used to indicate the first network element to update grid information.

A storage medium is further provided according to embodiments of the present disclosure, which stores a computer program. The computer program, when being executed by the processor, implements the method according to any one of the embodiments of the present disclosure.

When The computer program implements the message receiving method according to any one of the embodiments of the present disclosure, the method includes sending a request message to a second network element, the request message being used to indicate the second network element to send a request acknowledgement message; receiving the request acknowledgement message sent by the second network element, the request acknowledgement message carrying grid information of a target cell; and updating grid information of the first network element according to the grid information of the target cell carried in the request acknowledgement message.

When the computer program implements the message sending method according to any one of the embodiments of the present disclosure, the method includes: receiving a request message sent by a first network element; generating a request acknowledgement message according to the request message, and sending the request acknowledgement message to the first network element, where the request acknowledgement message carries grid information of a target cell, and the grid information of the target cell carried in the request acknowledgement message is used to indicate the first network element to update grid information.

The above are only exemplary implementations of the present disclosure, which are not intended to limit the scope of the present disclosure.

It is to be understood by the person skilled in the art that the term "user terminal" encompasses any appropriate type of radio user device, such as a mobile phone, a portable data processing apparatus, a portable web browser, or a vehicle-mounted mobile station.

The various embodiments of the present disclosure may be implemented in hardware or a dedicated circuit, software, logic, or any combination thereof. For example, some aspects of the various embodiments may be implemented in hardware, while other aspects of the various embodiments may be implemented in firmware or software that may be executed by a controller, a microprocessor, or other computing apparatuses, and the present disclosure is not limited thereto.

Embodiments of the present disclosure may be implemented by a data processor of a mobile apparatus executing computer program instructions, for example, the embodiments of the present disclosure may be implemented in a processor entity, by hardware, or by a combination of software and hardware. The computer program instructions may be assembly instructions, instruction set architecture (ISA) instructions, machine instructions, machine-related instructions, micro-codes, firmware instructions, state setting data, or source codes or object codes written in any combination of one or more programming languages.

The block diagrams of any logic flow in drawings of the present disclosure may represent program operations, or may represent interconnected logic circuits, modules, and functions, or may represent a combination of program operations, logic circuits, modules, and functions. The computer programs may be stored in a memory. The memory may be of any type suitable for a local technical environment and may be implemented using any suitable data storage technology, such as, but not limited to, a read-only memory (ROM), a random-access memory (RAM) and an optical memory apparatus and system (digital video disc (DVD) or compact disc (CD)). The computer-readable storage medium may include a non-transitory storage medium. The data processor may be of any type appropriate for the local technical environment such as, but not limited to, a general-purpose computer, a special purpose computer, a microprocessor, a digital signal processor (DSP), an application specific integrated circuit (ASIC), a field-programmable gate array (FPGA), or a processor based on a multi-core processor architecture.

What is claimed is:

1. A message receiving method, applied to a first network element, comprising:
   sending a request message to a second network element, wherein the request message is used to indicate the second network element to send a request acknowledgement message;
   receiving the request acknowledgement message sent by the second network element, wherein the request acknowledgement message carries grid information of a target cell; and
   updating grid information of the first network element according to the grid information of the target cell carried in the request acknowledgement message;
   wherein the first network element is a gNB centralized unit (gNB-CU) and the second network element is a gNB distributed unit (gNB-DU).

2. The method according to claim 1, before the sending a request message to a second network element, the method further comprises:
   determining the target cell based on grid information of a serving cell where the user equipment (UE) currently resides; and
   determining the second network element according to the target cell.

3. The method according to claim 1, wherein in a case where the first network element and the second network element each is a next generation nodeB (gNB), the request message is a handover request message, and the request acknowledgement message is a handover request acknowledgement message.

4. The method according to claim 1, wherein the request message is a UE context establishment request message and the request acknowledgement message is a UE context establishment response message; or, wherein the request message is a UE context modification request message and the request acknowledgement message is a UE context modification response message.

5. The method according to claim 1, wherein the grid information comprises grid index information and a UE identifier corresponding to a grid.

6. The method according to claim 5, wherein the grid index information comprises a public land mobile network identifier (PLMN ID), a gNB identifier (gNB ID), a cell identifier, frequency information, and a reference signal receiving power (RSRP) of a cell.

7. The method according to claim 1, wherein the grid information comprises a beam measurement result corresponding to a grid, wherein the beam measurement result corresponding to the grid comprises a synchronization signal-reference signal receiving power (SS-RSRP) and a channel state information-reference signal receiving power (CSI-RSRP).

8. The method according to claim 1, before the sending a request message to a second network element, further comprising:
receiving a configuration update message sent by the second network element, wherein the configuration update message carries predicted load information of granularity of grid; and
determining the target cell according to the predicted load information carried in the configuration update message.

9. The method according to claim 8, wherein the predicted load information is used to indicate load information of any cell over the second network element in a next time period.

10. The method according to claim 8, wherein the predicted load information comprises composite available capacity information, hardware load information, and physical resource block information.

11. A message sending method, applied to a second network element, comprising:
receiving a request message sent by a first network element; and
generating a request acknowledgement message according to the request message, and sending the request acknowledgement message to the first network element, wherein the request acknowledgement message carries grid information of a target cell, and the grid information of the target cell carried in the request acknowledgement message is used to indicate the first network element to update grid information;
wherein the first network element is a gNB centralized unit (gNB-CU) and the second network element is a gNB distributed unit (gNB-DU).

12. The method according to claim 11, wherein in a case where the first network element and the second network element each is a next generation nodeB (gNB), the request message is a handover request message, and the request acknowledgement message is a handover request acknowledgement message.

13. The method according to claim 11, wherein the request message is a user equipment (UE) context establishment request message and the request acknowledgement message is a UE context establishment response message, or, wherein the request message is a UE context modification request message and the request acknowledgement message is a UE context modification response message.

14. The method according to claim 11, before the receiving a request message sent by the first network element, further comprising:
sending a configuration update message to the first network element, wherein the configuration update message carries predicted load information of granularity of grid, the predicted load information carried in the configuration update message is used to indicate the first network element to determine the second network element; and
receiving a configuration update acknowledgement message sent by the first network element.

15. A device, comprising:
at least one processor; and
a memory, which is configured to store at least one program;
wherein the at least one program, when being executed by the at least one processor, causes the at least one processor to implement the method according to claim 1.

16. A non-transitory computer-readable storage medium storing a computer program, wherein the computer program, when being executed by a processor, implements the method according to claim 1.

17. A device, comprising:
at least one processor; and
a memory, which is configured to store at least one program;
wherein the at least one program, when being executed by the at least one processor, causes the at least one processor to implement the method according to claim 11.

18. A non-transitory computer-readable storage medium storing a computer program, wherein the computer program, when being executed by a processor, implements the method according to claim 11.

19. The method according to claim 1, wherein a grid is a space partition of a plurality of intra-frequency cells based on difference in serving cell and difference in signal quality after signal situations of the plurality of intra-frequency cells where a UE is located in a current environment is obtained by measurement.

20. The method according to claim 11, wherein a grid is a space partition of a plurality of intra-frequency cells based on difference in serving cell and difference in signal quality after signal situations of the plurality of intra-frequency cells where a UE is located in a current environment is obtained by measurement.

* * * * *